Aug. 6, 1940.   N. C. BREMER   2,210,276
CHAIN ADJUSTER
Filed July 12, 1938
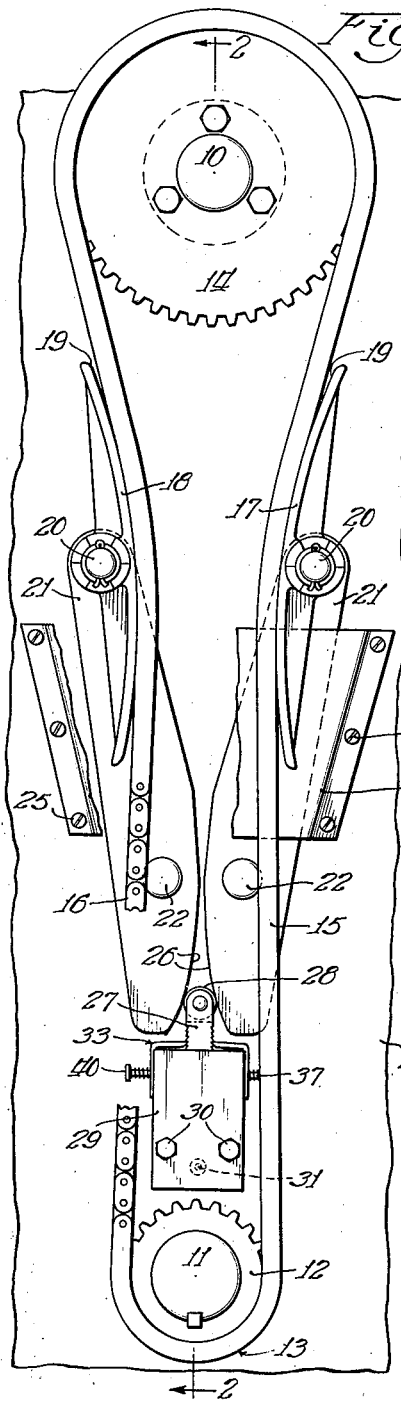
Inventor:
Norman C. Bremer
By: Edward C. Gritzbaugh
Atty.

Patented Aug. 6, 1940

2,210,276

UNITED STATES PATENT OFFICE 2,210,276

CHAIN ADJUSTER

Norman C. Bremer, Ithaca, N. Y., assignor to Morse Chain Company, Ithaca, N. Y., a corporation of New York Application July 12, 1938, Serial No. 218,813

9 Claims. (Cl. 74—242.11)

This invention relates to improvements in chain adjusters, and is particularly useful in connection with front end drives of motor vehicles, such as, for example, cam shaft or "timer" drives.

An object of the invention is to provide a chain adjusting mechanism adapted to withstand any chain tension that may be developed under high speed operating conditions and yet which will not impose excessive strain against the chain at low speeds of operation. Accordingly, the invention contemplates an arrangement in which, whenever sufficient elongation of the chain has occurred to require the taking up of slack, adjustment will take place during a period of operation when the chain is at minimum tension, the adjustment being effected by suitable followers in engagement with the stretches of the chain, and provides pressure mechanism for transmitting to such followers pressure sufficient to take up the slack in the chain when the latter is at minimum tension. Provision for withstanding driving tension is made in the form of a non-reversible wedge mechanism for checking retrograde movement of the followers after adjustment has taken place.

Another object of the invention is to provide a chain take-up mechanism which is adapted to take up the slack developed in a chain during long periods of operation, without altering the angular relationship between the respective shafts of the drive mechanism. To this end, in connection with a cam shaft drive of the type wherein the chain travels only between the cam shaft and the shaft which drives it, so as to incorporate only two stretches which are substantially parallel to each other, the invention provides means for adjusting both stretches of the chain in substantially constant ratio or equal increments of adjustment, so that the process of adjustment may not cause one of the shafts to rotate with respect to the other.

Another object of the invention is to provide chain adjustment mechanism adapted to transmit substantially constant pressure to the chain during its entire life of operation. Where springs are employed as the source of pressure, the contraction of the springs results in a gradual loss of compression or tension therein. Accordingly, the present invention contemplates the employment of a fluid motor adapted to react to pressure developed in a substantially constant pressure lubricating system of a motor vehicle, and to utilize such pressure in effecting chain adjustment. In addition, the means for transferring pressure from the lubricating system to the followers includes a piston or plunger acting against cammed surfaces on levers which carry the followers, the cammed surfaces being contoured in such a way that the ratio of transfer of pressure to the followers remains constant.

The invention further contemplates the provision of means for preventing loss of adjustment when the pressure drops to zero, as when the engine is stopped. To this end, there is provided a ratchet mechanism which prevents the piston of the fluid motor from receding any substantial distance from its operative position. The invention also deals with a problem that has been met with in the employment of ratchet or wedge mechanisms for checking retrograde movement of the chain followers after adjustment has been effected. Should the chain contract to any extent under changing temperature, the natural elasticity of the parts might not be sufficient to allow such contraction to occur. Accordingly, the ratchet mechanism is so constructed that it is adapted to yield, under excess pressure, from its normal checking position.

Other objects, the advantages and uses of the invention will become apparent after reading the following specification and claims, and after consideration of the drawing forming a part of the specification, wherein:

Fig. 1 is a front elevation of a motor vehicle cam shaft drive embodying the invention;

Fig. 2 is a vertical sectional view thereof, taken as indicated by the line 2—2 of Fig. 1;

Fig. 3 is a detail sectional view taken as indicated by the line 3—3 of Fig. 2; and Fig. 4 is a sectional view of a portion of a modified form of the invention.

As illustrative of one form in which the invention may be embodied, I have shown in the drawing the timing mechanism or cam shaft drive of a conventional overhead valve type of motor vehicle engine, in which the cam shaft 10 is located at a considerable distance from the crank shaft 11 from which it receives its drive. With such a distance separating the two shafts, the problems of preventing late timing caused by chain elongation, of preventing the chain from jumping over the teeth of the drive sprocket 12, and of dampening the tendency of the chain to whip or develop vibratory periods in sympathy with some torsional disturbance in either the crank shaft or the cam shaft, become accentuated. The present invention is concerned chiefly with that type of drive, and provides a complete solution for all of such problems in connection with such a drive, although it will be understood that the invention may be applied to any chain or endless flexible element drive wherein elongation may occur.

The drive chain is indicated generally at 13, being mounted to pass around the crank shaft sprocket 12 and the cam shaft sprocket 14. Its respective stretches, which are substantially parallel to each other, are indicated at 15 and 16, the stretch 15 being the driving stretch, and the stretch 16 being what normally may be termed the "slack" stretch.

Adjustment of the stretches 15 and 16 is effected by a pair of chain followers 17 and 18 respectively, adapted to engage the respective stretches 15 and 16. The followers 17 and 18 are preferably formed as shoes having arcuate chain engaging faces 19 contoured on relatively broad arcs of curvature, i. e., arcs of quite large radius of curvature. The amount of flexing required of the chain as it passes around the shoes, is therefore kept at a minimum, thus reducing joint wear and noise to a minimum. It will be appreciated, however, that the followers need not necessarily be in the form of shoes. The use of certain types of chain might make it more desirable to employ sprockets or rollers.

The shoes 17 and 18 are pivoted at 20 to the upper ends of levers 21 which in turn are pivoted at 22 to the engine block 23 of the mechanism to which the invention is applied. A guide yoke 24, secured at 25 to the engine block 23, may be arranged over the upper ends of the levers 21 to retain them in their proper plane of movement.

The lower ends of the levers 21 are formed, on their adjacent sides, with cammed surfaces 26. The levers are caused to swing around their pivots 22 so as to move the shoes 17 and 18 toward each other, by a fluid motor comprising a piston 27, the upper end of which carries a roller 28, which is engaged against the cam faces 26. The piston 27 is slidably received in a chamber 41 in a cylinder 29 secured, as by means of screws 30, to the cylinder block 23.

Pressure of the lubricating system is admitted to the cylinder 29 through a port 31 therein, and acts against the lower end of the piston 27 to move the same upwardly, causing the roller 28 to exert a wedging action between the cam faces 26 of the levers 21. The conventional lubrication system is adapted to maintain a fairly uniform oil pressure at all driving speeds, and the invention contemplates the utilization of such a system as the source of pressure for adjusting the chain 13.

The cam faces 26 are contoured so that the pressure thus transferred to the levers from the piston 27, is uniform at all stages of piston movement, whereby the pressure delivered to the chain (at any given engine speed) is uniform over the life of the apparatus.

The pitch of the cam faces 26 is sufficiently low so that the engagement of the roller 28 between them under normal oil pressure will effectively resist the back-wedging action of the levers under the load of maximum driving tension of the chain. Thus the cam and roller mechanism is irreversible as long as nominal pressure is exerted on the roller 28.

When the oil pressure drops to zero as a result of stopping of the engine, the oil pressure support of the piston 27 will be withdrawn. In order to maintain the mechanism in its approximate running condition at such times, there is provided ratchet means for checking retrograde movement of the shoes 17 and 18, comprising rack teeth 32, formed in diametrically opposed regions of the plunger 27, and pawls 33 engaging with the teeth 32. The pawls 33 are L-shaped, having arms 34 terminating in bevelled ends for engagement with the teeth 32, and arms 35 apertured at 36 to receive studs 37 by means of which the pawls are attached to the cylinder 29.

The pawls are positioned in channelled grooves 38 formed in the piston 29. They are held in place by coil springs 39, compressed between the arms 35 and the heads 40 of the studs 37. The pawls may move away from each other, fulcrumming around their lower ends against the compression of the springs 39, in order to allow the teeth 32 to move upwardly between the ends of their arms 34. After a period of elongation of the chain 15, attended by a gradual advance of the piston 27 between the cam faces 26, the piston 27 will reach a position where the arm 34 of a pawl will enter the space below a tooth succeeding a tooth against which the pawl was formerly engaged.

The teeth 32 on one side of the piston 27 are staggered with relation to those on the opposite side of the piston, so as to provide a maximum number of steps of adjustment.

Immediately after such a step of adjustment of the chain, the chain will be so tight that, should it contract under a temperature change, for example, injury might occur if the pawls 33 were unyielding in their checking positions. Provision is therefore made for allowing the pawls to yield or recede from their normal checking positions, (the position of the righthand pawl in Fig. 3) in the event of excess back pressure. To this end, the arms 34, instead of lying flatly against the upper end of the cylinder 29 when in their normal checking positions, are inclined upwardly and inwardly somewhat so that their ends in engagement with the piston 27 are spaced from the upper end of the cylinder 29. Consequently, excess downward pressure against the piston 27 will cause a pawl to yield downwardly, and to fulcrum around one of the corners 41 of the cylinder defined between the upper end of the cylinder and the grooves 38, the arms 35 swinging outwardly against the compression of the springs 39.

The piston 27 has a sufficiently snug fit in the cylinder 29 so that it is constrained to move in a fixed straight line path of movement, irrespective of whether it is exerting pressure against one or both of the levers 21. As a result, when the drive is in operation, the tightening of the driving stretch 15 of the chain against the shoe 17, will cause the lever 21, on which the shoe 17 is mounted, to engage the roller 28 so as to prevent the piston 27 from advancing, while the pressure between the shoe 18 and the other stretch of the chain, may be relaxed as a result of the slackening of the latter in response to the tightening of the driving stretch 15. As a result, there will be very little pressure against the slack stretch of the chain during operation, a condition which is desirable for the smooth operation of the mechanism.

In the modified form of the invention shown in Fig. 4, the chamber 41 is elongated below the inlet port 31, as shown, to form a pressure storage reservoir 42. A piston 43 is mounted in the reservoir 42 and urged toward the piston 27 by a coil spring 44. The resistance of the spring 44 is somewhat less than the oil pressure delivered by the lubricating system, so that while the engine is running, the piston 43 will be forced downwardly, allowing the reservoir 42 to fill with oil. When the engine stops, the spring 44 will force the piston back upwardly, thus exerting a sustained pressure against the piston 27 after stoppage of the engine, the port 31 being sufficiently restricted to require a definite time interval for the oil to escape back to the lubricating system, whereby adjustment may be effected after stopping of the engine.

Instead of the restricted port 31, a check valve may be employed for the purpose of holding the pressure.

The cam and roller mechanism serves the threefold purpose of: (1) moving the adjusting members inwardly to take up slack caused by gradual lengthening of the chain and of preserving the correct angular phase relationship of the sprockets during such takeup; (2) acting as a non-reversible wedge to prevent retrograde movement of the shoes under high speed chain tension, and (3) maintaining a uniform shoe pressure under changing angular position of the levers.

The ratchet and pawl mechanism serves two purposes: (1) preventing loss of adjustment when the engine stops, and (2) to relieve excess chain tension that may develop at times during extreme temperature changes.

At low engine speeds, chain tension will be at a minimum because of the absence of high inertia forces that must be overcome by the cam shaft during high speed operation. The parts are arranged so that takeup will occur during such periods of low tension, so that the active pressure exerted against the chain by the adjusting mechanism may be maintained at a minimum, thereby avoiding undue wear and heating.

I claim:

1. In combination with a drive including a flexible endless driving element and a source of fluid pressure, means for taking up slack in said element including a cylinder communicating with said source so as to receive fluid therefrom, a piston in said cylinder, means for transmitting pressure from said piston to said flexible drive element, and ratchet means for checking retrograde movement of said piston, said ratchet means including a rack associated with the piston and a pawl pivoted with respect to the cylinder and engageable with the rack, and spring means for maintaining said pawl in an intermediate, normal checking position, and allowing said pawl, under yielding resistance, to move to one side of said normal checking position for allowing said piston to advance to take up slack, or to the other side of said normal checking position for allowing said piston to recede under contraction of said flexible driving element.

2. In combination with a drive including an endless flexible driving element, means for taking up slack in said driving element, including a follower in contact with said element, a source of oil under pressure and ratchet mechanism arranged to receive pressure from said source, to transfer it to said driving element, and to check retrograde movement of said follower when oil pressure ceases, said ratchet mechanism including a ratchet member and a spring-urged pawl coacting therewith and arranged to have a normal checking position from which it may, under yielding resistance, recede so as to allow said follower to yield under excess tension in said driving element.

3. In a motor vehicle timer drive including spaced driving and driven shafts, sprockets thereon, and a chain connecting said sprockets and having spaced substantially parallel stretches, take-up followers in engagement with each of said stretches, a source of pressure, and means to adjust said followers toward said stretches in response to chain elongation, in substantially fixed ratio increments of adjustment, whereby to maintain a constant angular relationship between said shafts, said adjusting means including a common element reacting to pressure from said source and having positive thrust transmitting association with each of said followers.

4. In a motor vehicle timer drive including spaced driving and driven shafts, sprockets thereon, and a chain connecting said sprockets and having spaced substantially parallel stretches; take up followers in engagement with each of said stretches, a source of pressure, a common element reacting to pressure from said source, means for positively transferring thrust from said element to each of said followers so as to take up slack in said chain resulting from chain elongation, in substantially fixed ratio increments of adjustments, means for checking retrograde movement of said element so as to determine fixed relative positions of maximum separation of said followers for each increment of adjustment, such that when the drive is in operation, the pressure transmitted by said first mentioned means may be confined substantially to the driving stretch of the chain, allowing the slack stretch to travel past its follower without enduring substantial pressure therefrom.

5. In a chain drive including spaced driving and driven shafts, sprockets thereon, and a chain connecting said sprockets and having spaced substantially parallel stretches, a pair of pivotally mounted levers, a follower carried by an end of each lever and in engagement with a respective stretch of said chain, the opposite ends of the levers being provided with opposed cam surfaces, a source of pressure, and means including a plunger having a fixed path of movement adapted to react against said cam surfaces to adjust said followers toward said stretches in fixed ratio increments of adjustment, and, when the drive is in operation, to transmit pressure only to the follower in engagement with the driving stretch of the chain.

6. In a chain drive including spaced driving and driven shafts, sprockets thereon, and a chain connecting said sprockets and having spaced substantially parallel stretches, a pair of pivotally mounted levers, a follower carried by each lever and in engagement with a respective stretch of said chain, a source of pressure, and a common mechanical element for transferring pressure therefrom to both of said levers, said element having a fixed path of movement so as to cause said followers to be adjusted toward each other in fixed ratio increments of adjustment, whereby to maintain a constant angular relationship between said shafts.

7. In a chain drive including spaced driving and driven shafts, sprockets thereon and a chain connecting said sprockets and having spaced substantially parallel stretches; a pair of pivotally mounted levers, a follower carried by each lever and in engagement with a respective stretch of said chain, a source of fluid pressure, a fluid motor including a piston adapted to be projected by fluid from said source, having a projecting end in positive thrust transmitting association with each of said levers, and adapted, during periods when the chain is not in driving operation, to adjust said followers toward each other in fixed ratio increments of adjustment for taking up slack in said chain arising from chain elongation, and ratchet means for checking retrograde movement of said piston so as to determine fixed relative positions of maximum separation of said followers for each increment of adjustment, such that when the drive is in operation, the pressure resistance of said followers may be confined substantially to the driving stretch of the chain, allowing the slack stretch to travel past its follower without enduring substantial pressure therefrom.

8. In a chain drive including spaced driving and driven shafts, sprockets thereon, and a chain connecting said sprockets and having spaced substantially parallel stretches, a pair of pivotally mounted levers, a follower carried by each lever and in engagement with a respective stretch of said chain, said levers being provided with opposed cam surfaces, a source of pressure, and means arranged to receive pressure therefrom and to engage said cam surfaces, so as to adjust said followers against their respective stretches, said cam surfaces being contoured so as to maintain a substantially constant ratio of pressure transferred from said source to said levers.

9. In a chain drive including spaced driving and driven shafts, sprockets thereon, and a chain connecting said sprockets and having spaced substantially parallel stretches, a pair of pivotally mounted levers, a follower carried by each lever and in engagement with a respective stretch of said chain, a source of pressure, means for transferring pressure from said source to said levers, said means comprising a mechanical element reacting to said pressure and having positive thrust engagement with each of said levers, said levers being arranged to reduce the pressure as applied to said followers, to an amount sufficient to take up slack in the chain when the latter is idle, but insufficient to resist driving tension of the chain, and ratchet means for checking retrograde movement of the follower that is in engagement with the driving stretch of the chain, under the tension in said driving stretch.

NORMAN C. BREMER.